W. R. COMFORT.
DREDGING APPARATUS.
APPLICATION FILED OCT. 22, 1909.
959,115.
Patented May 24, 1910.
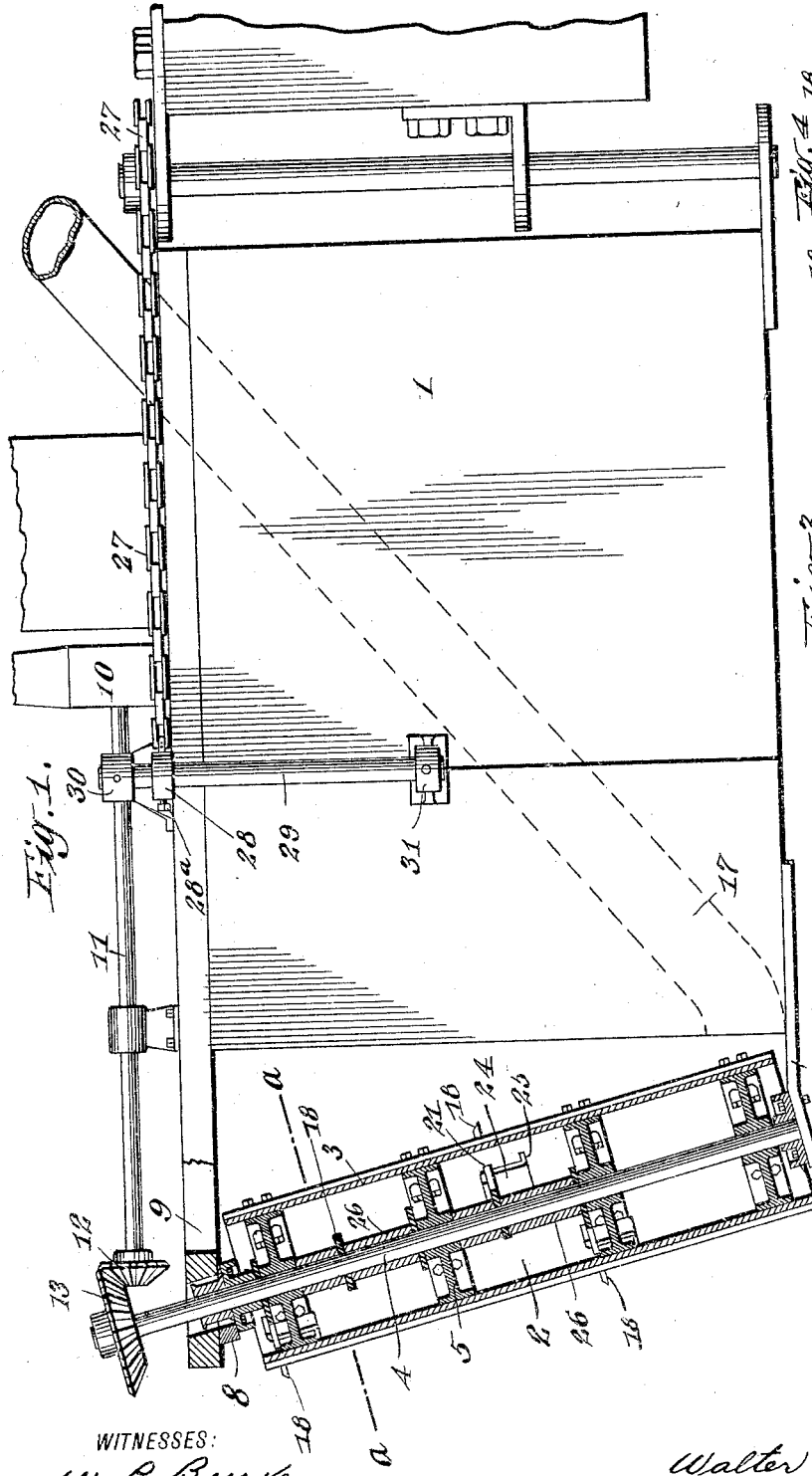
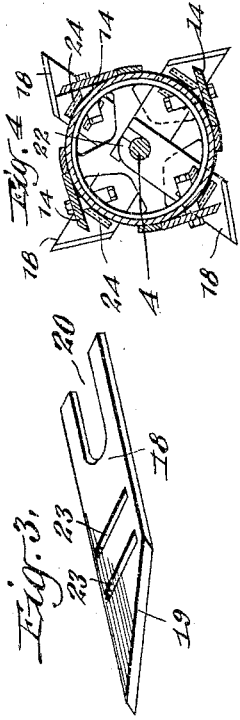
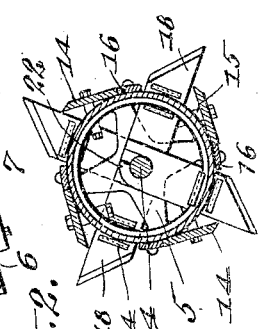
WITNESSES:
W. P. Burke
A. F. Heuman
INVENTOR
Walter R. Comfort
BY
ATTORNEY

UNITED STATES PATENT OFFICE.

WALTER R. COMFORT, OF NEW YORK, N. Y.

DREDGING APPARATUS.

959,115.  Specification of Letters Patent.  Patented May 24, 1910.

Application filed October 22, 1909. Serial No. 524,058.

*To all whom it may concern:*

Be it known that I, WALTER R. COMFORT, a citizen of the United States, residing at 32 New Chambers street, in the city, county, and State of New York, have invented new and useful Improvements in Dredging Apparatus, of which the following is a specification.

This invention relates to dredging apparatus, and more particularly to apparatus of the type which is designed to cut a canal immediately in front of itself of sufficient depth to float its own body, and to advance step by step as the excavation takes place.

One of the objects of the invention is to provide a cutting implement to be employed with apparatus of this character, which will cut the material to be operated upon into sections capable of passing freely through the suction conduit without danger of forming a stoppage therein.

Another object is to provide a cutting implement which will be simple in construction, strong and durable, and efficient in use.

Other objects will be in part obvious, and in part pointed out hereinafter.

The invention includes the combination and arrangement of parts hereinafter described, and particularly pointed out in the claims.

In the accompanying drawing, in which is shown one embodiment of the invention, Figure 1 is a side elevation of a float, with the cutting implement positioned thereon, the latter being shown in section. Fig. 2 is a sectional view taken on line *aa* of Fig. 1. Fig. 3 is a perspective view of one of the radial knives. Fig. 4 is a view similar to Fig. 2, showing a slightly modified form.

This invention is an improvement on the invention shown and described in my copending application Serial #482,432, filed March 10, 1909. It has been found in practice that when cutting implements associated with dredging apparatus come in contact with a tree stump, roots, vines, or other solid or semi-solid material, it is apt to cut off a portion thereof of such a size that it cannot readily pass through the suction conduit, and this is apt to result in a stoppage of such conduit, which causes delay and inconvenience in removing the obstructing material. By means of the present invention any solid or semi-solid matter which may be acted upon by the cutting implement is cut into sections, each of which is small enough to pass readily through the conduit, thereby avoiding any danger of stoppages in same.

Referring to the drawings 1 indicates a float of any suitable construction, which may be the supplemental float shown in my co-pending application above referred to, and which is adapted to move vertically and laterally with respect to the main float. A cutting implement 2 is carried by the float, being preferably canted slightly out of the perpendicular or vertical position, and comprises a cylindrical supporting portion 3 secured to a shaft 4 as by means of spiders 5. The shaft 4 is stepped at its lower end in a suitable bearing 6, carried by a plate 7 projecting from the float, and the upper end of the shaft is journaled in a suitable bearing 8 supported by a projection 9. Rotary movement may be communicated to the cutting implement in any suitable manner, as, for example, by means of an engine 10 mounted upon the float, and driving a shaft 11, bearing a bevel pinion 12, which engages with a bevel pinion 13, secured to the shaft 4. Secured to the cylinder 3 are a plurality of cutting knives 14, each of which is in the form of a flat plate, extending tangentially from the cylinder and has its front edge sharpened and spaced from the cylinder by suitable spacing members 15. The rear edge of each knife rests against a backing plate 16 secured to the cylinder in any suitable manner. The parts thus far described are substantially the same as those shown in the co-pending application above referred to.

In order to cut the material operated upon into sections adapted to pass through the suction conduit 17, a plurality of radially arranged cutting knives 18 are provided, each of which is provided with a cutting edge 19, at its outer end, and has its inner end bifurcated as shown at 20 for attachment to the shaft 4 as hereinafter described. The radial knives 18 pass through suitable slots 21 formed in the cylindrical member 3, with their bifurcated ends embracing the shaft 4, and may be retained in position by having one of the bifurcated portions upset around the shaft as indicated at 22 in Fig. 2.

In order to assist in holding the knives in position, each one is preferably provided with a pair of slots 23, 23, adapted to be positioned at opposite sides of the cylindrical member 3, and a suitable strap 24 is passed through these slots and through a slot 25 in the cylindrical member at a point spaced from the slot 21 through which the knife passes. For preventing vertical movement at the inner end of the knives, sleeves 26, or other spacing means, are preferably provided, which surround the shaft 4, and are in engagement with the inner ends of the knives and the spiders, as indicated in Fig. 1.

The radial knives are preferably arranged in a spiral or staggered relation as indicated in Figs. 1 and 2, and, in the modification shown in Fig. 2, are so positioned that their rear edges are in line with the cutting edges of the tangential knives. If desired, the cutting edges of the tangential knives may be provided with notches or recesses to receive the rear edges of the radial knives, as indicated in Fig. 4.

Any desired number of the radially extending knives may be employed, there being five shown in the drawing, although it is of course understood that the invention is not to be limited to this precise number. The knives are spaced from one another horizontally a distance such that they will cut sections of material small enough to pass through the suction conduit. In practice it has been found that good results are obtained if the distance between the knives is five or six inches, but of course this distance may be varied if the circumstances warrant it.

It will be seen from the above that the radial knives may be quickly removed if it is desired to sharpen the same, or if it is necessary to replace a broken knife by a new one, it being merely necessary to bend up the upset portion 22, and remove the strap 24, after which the knife may be readily withdrawn, and another one may be inserted in its place by merely sliding the same through the slot 21 in the cylinder, placing the strap in position as indicated, and upsetting the bifurcated end.

A horizontal or a lateral movement of the supplemental float 1 may be effected by means of a chain 27, operatively attached to the sides thereof, and adapted to be actuated from the main float in any suitable manner, as for example, in the manner shown in the above mentioned co-pending application. In order to maintain the chain substantially horizontal when the supplemental float is in its raised or lowered positions, there is provided a sliding connection comprising guide rods 29 secured to the sides of the supplemental float by suitable supports 30 and 31, upon which rods, rings 28 are adjustably mounted. The ends of the chain 27 are secured to the rings 28 and set screws 28ª are employed for holding the rings in position upon the rods.

The operation of the device which should be largely obvious from the above description is as follows: Assuming that the roots of a tree are positioned in the material which is being cut away, the radial knives which, as shown, extend beyond the tangential knives will cut into the same, and separate them into sections of the desired size before the tangential knives come into contact therewith. By means of this device it will therefore be seen that all solid or semi-solid matter will be cut into small sections adapted to pass freely through the suction conduit.

The device is simple in its construction, easily assembled, and is extremely efficient in use. When the supplemental float is raised or lowered, it is merely necessary to loosen the set screws 28ª and slide the rings 28 along the guide rods 29 until the chain 27 is substantially horizontal, after which the set screws may be tightened to hold the rings in position.

It will be understood that certain of the parts and the described arrangements may be altered or changed within a large range, or substitutions made without departing from the spirit and scope of the invention.

Having described the invention, what I claim as new and desire to secure by Letters Patent is:

1. In apparatus of the class described, in combination, a cutting implement comprising a cylindrical support, a knife carried thereby and projecting tangentially therefrom, a second knife carried thereby and projecting radially therefrom, the rear edge of said knife engaging the cutting edge of said first knife.

2. In apparatus of the class described, in combination, a cutting implement comprising a cylindrical support, a knife carried thereby and projecting tangentially therefrom, said knife being provided with a notch in one of its edges, and a second knife carried by said support and projecting radially therefrom, said second knife having one of its edges engaging the notch in said first knife.

3. In apparatus of the class described, in combination, a cutting implement comprising a cylindrical support, a knife carried thereby and projecting tangentially therefrom, said knife being provided with a notch in its cutting edge, and a second knife carried by said support and projecting radially therefrom, the rear edge of said second knife engaging the notch in said first knife.

4. In apparatus of the class described, in combination, a support provided with an opening therethrough, a shaft upon which said support is mounted, a knife extending through said opening and having its inner end secured to said shaft and fastening means engaging said knife and extending through said support to assist in holding the knife in position.

5. In apparatus of the class described, in combination, a support provided with an opening therethrough, a shaft upon which said support is mounted, a knife extending through said opening and having its inner end secured to said shaft and fastening means engaging said knife and said support to assist in holding the knife in position.

6. In apparatus of the class described, in combination, a support provided with an opening therethrough, a shaft upon which said support is mounted, a knife extending through said opening and having its inner end secured to said shaft, said knife being provided with an opening therethrough and fastening means extending through the opening in the knife and through the support to assist in holding the knife in position.

7. In apparatus of the class described, in combination, a support provided with an opening therethrough, a shaft upon which said support is mounted, a knife extending through said opening and having its inner end secured to said shaft, said knife being provided with a pair of openings therethrough, said openings being so positioned that when the knife is in position one opening will lie at one side of said support and the other opening will lie at the other side of said support, and fastening means extending through said openings and through said support to assist in holding the knife in position.

8. In apparatus of the class described, in combination, a cylindrical support provided with an opening therethrough, a shaft upon which said support is mounted, a knife extending through said opening and having its inner end detachably secured to said shaft, and fastening means extending through said knife and through said support to assist in holding the knife in position.

In testimony whereof I have signed my name to this specification in the presence of two subscribing witnesses.

WALTER R. COMFORT.

Witnesses:
DOUGLAS NICHOLSON,
J. TURNER GRIEVE.